(12) United States Patent
Watson et al.

(10) Patent No.: US 11,703,147 B2
(45) Date of Patent: Jul. 18, 2023

(54) THREE-DIMENSIONAL TORTUOUS PATH FLOW ELEMENT FOR CONTROL VALVES

(71) Applicant: Control Components, Inc., Rancho Santa Margarita, CA (US)

(72) Inventors: Dan Watson, Rancho Santa Margarita, CA (US); Stephen Freitas, Rancho Santa Margarita, CA (US); Uzair Ahmed, Rancho Santa Margarita, CA (US); Raymond R. Newton, Rancho Santa Margarita, CA (US)

(73) Assignee: CONTROL COMPONENTS, INC., Rancho Santa Margarita, CA (US)

( * ) Notice: Subject to any disclaimer, the term of this patent is extended or adjusted under 35 U.S.C. 154(b) by 50 days.

(21) Appl. No.: 17/142,482

(22) Filed: Jan. 6, 2021

(65) Prior Publication Data
US 2021/0207741 A1    Jul. 8, 2021

Related U.S. Application Data

(60) Provisional application No. 62/958,437, filed on Jan. 8, 2020.

(51) Int. Cl.
*F16K 47/08* (2006.01)
*B33Y 80/00* (2015.01)
*B33Y 10/00* (2015.01)

(52) U.S. Cl.
CPC ........... *F16K 47/08* (2013.01); *B33Y 10/00* (2014.12); *B33Y 80/00* (2014.12)

(58) Field of Classification Search
CPC ......... F16K 47/08; F16K 3/246; B33Y 10/00; B33Y 80/00
See application file for complete search history.

(56) References Cited

U.S. PATENT DOCUMENTS

| 11,079,031 B2* | 8/2021 | Gabriel | ............... F16K 3/267 |
| 2005/0199298 A1 | 9/2005 | Farrington | |
| 2009/0183790 A1 | 7/2009 | Moore | |
| 2014/0332103 A1 | 11/2014 | Kwon et al. | |
| 2016/0102781 A1 | 4/2016 | Glaun | |
| 2021/0209276 A1* | 7/2021 | Watson | ............... G06F 30/28 |

OTHER PUBLICATIONS

International Search Report and Written Opinion for PCT/US2021/012464; dated Apr. 6, 2021.
India First Examination Report for India Application No. 202247042839; dated Aug. 24, 2022.

* cited by examiner

*Primary Examiner* — Rick K Chang
(74) *Attorney, Agent, or Firm* — Stetina Brunda Garred and Brucker; Mark B. Garred

(57) ABSTRACT

A flow control element includes an element body formed as a unitary structure and disposed about a body axis. The element body includes a first surface, a second surface in spaced relation to the first surface, and an inner peripheral surface extending between the first and second surfaces and defining a central bore extending along the body axis. The element body additionally includes an outer peripheral surface extending between the first and second surfaces in spaced relation to the inner peripheral surface. A plurality of passageways extend between the inner peripheral surface and the outer peripheral surface, with each passageway having a pair of side surfaces extending in generally opposed relation to each other and a pair of beveled surfaces extending toward each other from respective ones of the pair of side surfaces.

20 Claims, 5 Drawing Sheets

THREE-DIMENSIONAL TORTUOUS PATH FLOW ELEMENT FOR CONTROL VALVES

CROSS-REFERENCE TO RELATED APPLICATIONS

The present application claims priority to U.S. Provisional Application Ser. No. 62/958,437, filed Jan. 8, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a flow control element, and more specifically to a flow control element formed via additive manufacturing and having a plurality of uniquely contoured flow control passageways formed therein.

2. Description of the Related Art

Multi-stage trim in control valves are used for facilitating pressure drops in fluid flowing through the control valve. Previous designs for such control valves include the use of a reciprocating trim element that moves within a series of stacked plates which have connecting flow paths with alternate longitudinal and transverse elements that form tortuous flow paths. The geometric construction of the flow paths may require that each flow path be segmented into its own volumetric space within the plate. As a result, the plate may have a generally large outside diameter and vertical height, or valve stroke, to provide the desired number of stages and flow capacity.

There are two conventional styles of stacked plate designs. In one style, the flow path is created by cutting in-plane bends on the plate. In another style, the flow path is created by cutting a series of offset slots in two mating plates to define a flow path that snakes or bends up and down from slot to slot. The offset style may utilize a third plate to separate adjacent flow paths. In both styles, the plates may be joined together via brazing.

Although the stacked plate design may be effective in creating the desired flow paths, there may be several deficiencies associated therewith. For instance, material utilization to create the conventional stacked plate design may be relatively high. Along these lines, each flow path may require adjacent blank material to provide structural support during manufacture and when assembled into a disk stack assembly in the valve. As a result, the material that contains the flow path is far in excess of the material required to control flow and withstand operating pressures.

The stacked plate design may also require that the disk stack be maintained under compression inside the valve. The compression may be achieved by transmitting a portion of the bonnet bolt load of the surrounding valve housing to the disk stack. In valves with a bolted bonnet, costly precision machining of the valve body and trim components may be required to maintain compression on the stacked plates. In valves with pressure-energized bonnet seals, additional mechanical devices may be applied to maintain compression on the stacked plates.

Accordingly, there is a need in the art for an improved multi-path flow control element that is not formed from a stack of disks. Various aspects of the present disclosure address this particular need, as will be discussed in more detail below.

BRIEF SUMMARY

The present disclosure is directed toward a multi-stage, multi-path flow control trim element that is optimized for additive manufacturing methods. The flow control element includes nested flow paths that may reduce the outer diameter and/or the height of the control element by approximately 30% relative to conventional disk stacks. As a result, the size and cost of both the control element and the control valve may be reduced.

In accordance with one embodiment of the present disclosure, there is provided a flow control element comprising an element body formed as a unitary structure and disposed about a body axis. The element body includes a first surface, a second surface in spaced relation to the first surface, and an inner peripheral surface extending between the first and second surfaces and defining a central bore extending along the body axis. The element body additionally includes an outer peripheral surface extending between the first and second surfaces in spaced relation to the inner peripheral surface. A plurality of passageways extend between the inner peripheral surface and the outer peripheral surface. Each passageway has a pair of side surfaces extending in generally opposed relation to each other and a pair of beveled surfaces extending toward each other from respective ones of the pair of side surfaces.

The plurality of passageways may be arranged in a plurality of axial arrays, with each array being parallel to the body axis. Each passageway may include an opening at the outer peripheral surface, with the openings of the passageways in adjacent arrays being offset relative to each other in a direction parallel to the body axis.

Each passageway may extend along at least two axes. Each side surface may include at least two angled segments adjacent each other to define an apex. The pair of side surfaces may include a first side surface having a first set of apexes aligned along a common axis. The pair of side surfaces may also include a second side surface having a second set of apexes aligned along the common axis.

Each passageway may define a width as a perpendicular distance between the pair of side surfaces, with each passageway being configured such that the width varies along the passageway.

According to another embodiment, there is provided a method of forming a flow control element. The method includes forming an element body with successive layers of material, with each layer becoming unitarily formed with an underlying layer.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
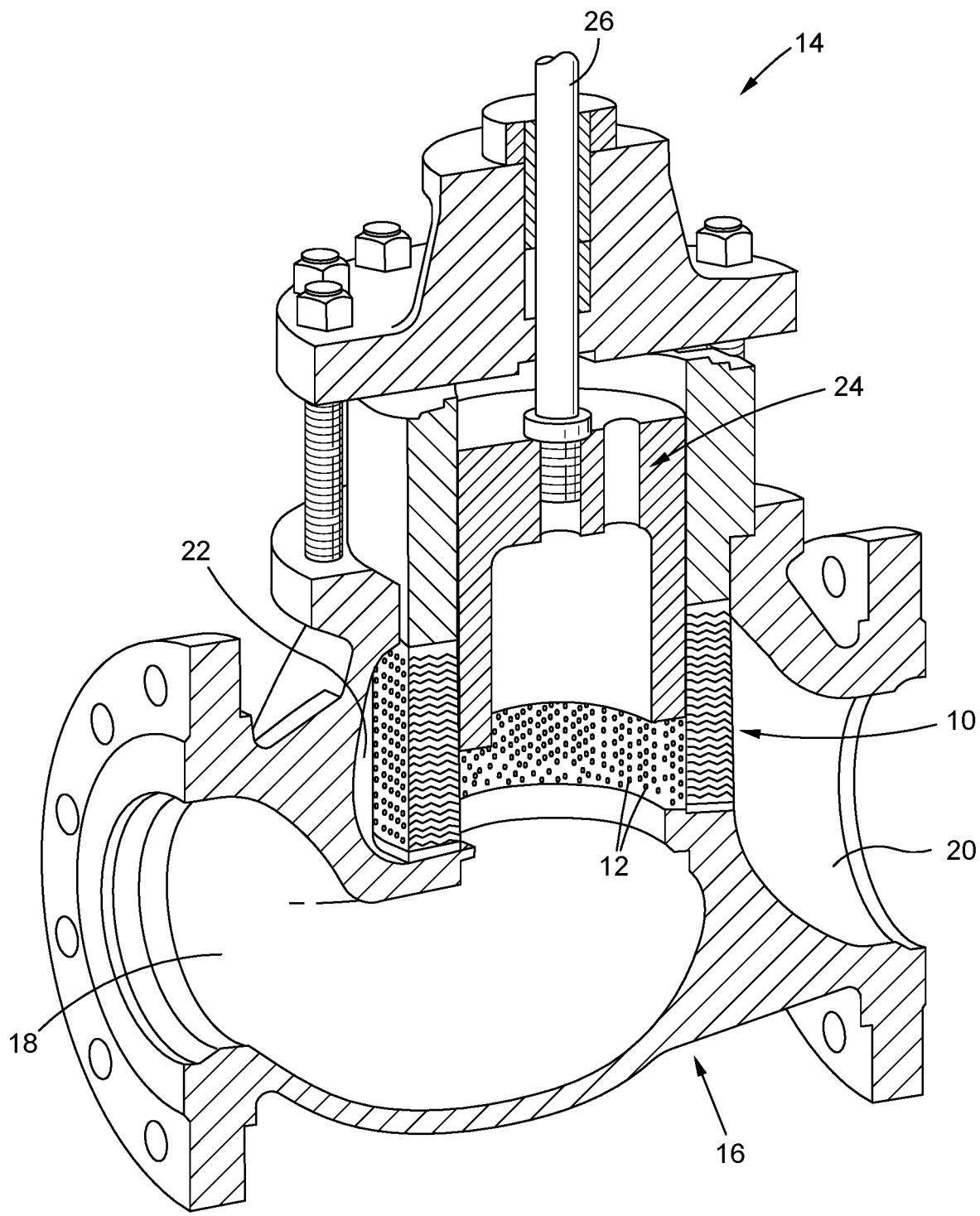
FIG. 1 is an upper perspective sectional view of a flow control element formed in accordance with an exemplary embodiment of the present disclosure, the flow control element being integrated into a fluid control valve.

The detailed description set forth below in connection with the appended drawings is intended as a description of certain embodiments of a flow control element and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings wherein the showings are for purposes of illustrating preferred embodiments of the present disclosure, and not for purposes of limiting the same, there is depicted a flow control element 10 having a plurality of three-dimensional tortuous flow passageways 12, which may be specifically optimized for additive manufacturing methods. The configuration of the flow passageways 12 may be configured to provide support to the flow control element 10 during additive manufacturing of the flow control element 10. The flow passageways 12 may be arranged within the flow control element 10 in a nested, configuration, which may maximize the number of flow passageways 12 within a given flow control element 10. The unique configuration of the flow control element 10 may allow for a reduction in the size of the outer diameter and/or height of the flow control element 10 by approximately 30% relative to conventional devices. Accordingly, a reduction in overall size and cost of the flow control element 10 may be achieved, as well as the corresponding control valve which houses the flow control element 10. As such, the flow control element 10 may be suitable for use in smaller flow control systems or flow control systems with space limitations.

Referring now specifically to FIG. 1, the flow control element 10 is shown incorporated into an exemplary control valve 14 having a valve body 16. The valve body 16 includes an inlet 18, an outlet 20, and a gallery 22 located between the inlet 18 and the outlet 20. The flow control element 10 is located in the gallery 22 such that fluid passes through the flow control element 10 as the fluid flows from the inlet 18 to the outlet 20. A valve plug 24 may be reciprocally positionable relative to the flow control element 10 to control the amount of fluid that may pass through the flow control element 10, and thus, the amount of fluid that may flow through the outlet 20. The plug 24 included in the control valve 14 depicted in FIG. 1 is positioned inside the flow control element 10 and is raised to expose passageways 12 formed in the flow control element 10 to allow for fluid flow therethrough. The plug 24 may be lowered relative to the plug 24 to cover passageways 12 formed in the flow control element 10 to block fluid flow therethrough. Thus, by either raising or lowering the plug 24, the amount of fluid that may pass through the flow control element 10 may be controlled. The valve plug 24 may be connected to an axially reciprocal valve stem 26 to facilitate the selective raising and lowering of the valve plug 24 relative to the flow control element 10.

Figure 2:
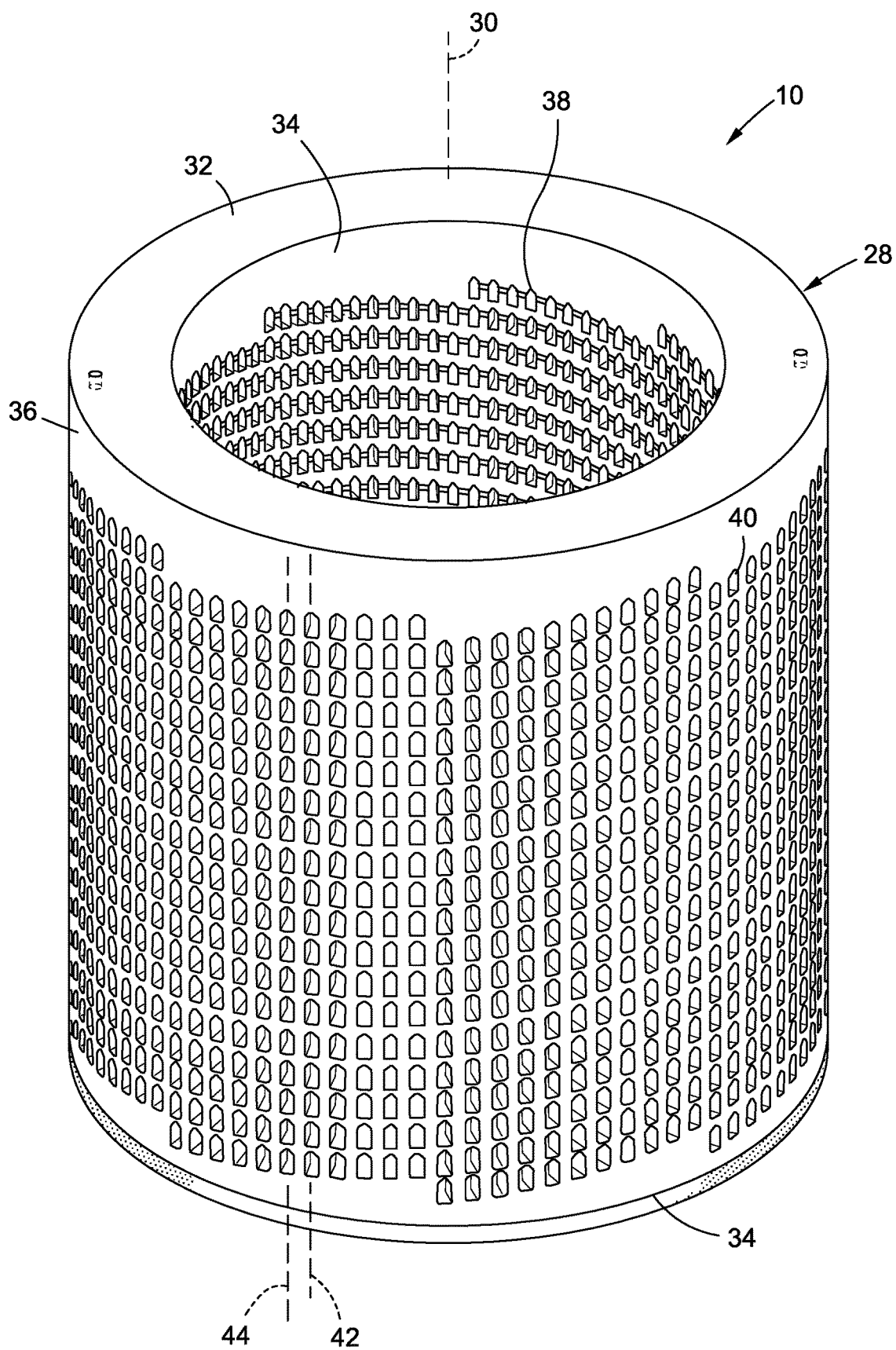
FIG. 2 is an upper perspective view of the flow control element shown in FIG. 1.

Referring now to FIG. 2, the flow control element 10 includes an element body 28, which may be formed as a unitary structure, as will be described in more detail below. The element body 28 may be a generally annular structure which defines and thus is disposed about a body axis 30. The element body 28 has a first (top) surface 32 and an opposing second (bottom) surface 34. The element body 28 additionally includes an inner peripheral surface 34 and an outer peripheral surface 36 both of which extend between the first and second surfaces 32, 34. The inner peripheral surface 34 defines a central bore which extends along the body axis 30, i.e., the axis 30 is common to the central bore which has a generally circular cross-sectional profile. As will be recognized from FIG. 1, in the exemplary control valve 14, the above-described plug 24 is capable of reciprocal movement within the central bore of the element body 28.

The plurality of passageways 12 formed in the element body 28 extend between the inner peripheral surface 34 and the outer peripheral surface 36. Each passageway 12 defines an inner opening 38 on the inner peripheral surface 34 and an outer opening 40 on the outer peripheral surface 36. Each passageway 12 may also define a tortuous configuration between the inner opening 38 and outer opening 40, and thus, may extend along or parallel to at least two axes. The tortuous configuration results in a series of bends or twists of each passageway 12 between the inner and outer peripheral surfaces 34, 36.

The passageways 12 may be arranged in a manner which optimizes space on the flow control element 10, while also allowing for additive manufacture thereof (e.g., formation of the flow control element 10 in a layer-by-layer fashion). In one embodiment, the passageways 12 may be arranged in a plurality of axial arrays. In the embodiment shown in FIG. 2, the passageways 12 are aligned in axial, vertical arrays around the perimeter of the flow control element 10. In other words, when viewed from the perspective shown in FIG. 2, the passageways 12 are presented in an array of generally vertical columns which span the perimeter of the element body 28, the passageways 12 in each such column thus being in vertical alignment with each other. Each of these columns extends along a respective column axis which is generally parallel to the body axis 30. In this regard, as to a given array or column of passageways 12, the inner openings 38 of each passageway 12 on the array lie along a common inner axis which is generally parallel to both the column axis and the axis 30. In a similar fashion, the outer openings 40 of each passageway 12 on the array lie along a common outer axis which is generally parallel to both the column axis and the axis 30. As such, in each array or column, the passageways 12 may be stacked on top of each other. To illustrate the configuration of the arrays, in the embodiment depicted in FIG. 2, a first array is aligned with a first column axis 42 and a second array is aligned with a second column axis 44. As can be seen, the arrays are spaced apart from each other, and are located around the entire circumference of the element body 28.

It is contemplated that the arrangement of passageways 12 in one array or column may be slightly spaced, offset, or staggered relative to the arrangement of passageways 12 in the adjacent arrays or columns. In other words, the passageways 12 in adjacent arrays may be slightly offset relative to each other in a direction parallel to the body axis 30. In this regard, a given circumferential axis perpendicular to the body axis 30 may pass through one passageway 12 and not through an adjacent passageway 12 due to the offset arrangement. The offset configuration of the passageways 12 may result in the passageways 12 being presented in a generally helical or spiral array, such as when viewed from the perspectives shown in FIGS. 2-4. In other words, the offsetting or staggering of the passageways 12 may result in passageways 12 being aligned along helical axes which extend around the element body 28.

The offsetting or staggering of the passageways 12 in adjacent arrays may eliminate or reduce coplanar gaps and dead band as the valve plug 24 is opened or closed within the valve 14. For instance, as the plug 24 is raised or lowered within the central bore of the flow control element 10, the passageways 12 in adjacent arrays may be sequentially covered or uncovered, rather than being simultaneously covered or uncovered.

Although the exemplary embodiment of the flow control element 10 includes passageways 12 that are offset or staggered in the above-described manner, the scope of the present disclosure is not limited thereto. Thus, in other embodiments, it is contemplated that the passageways 12 in adjacent arrays or columns may be aligned such that, when viewed from a perspective like that shown in FIG. 2, they are presented in a stacked series of generally circular rows, each of which extends along a respective, common circumferential axis circumventing the axis 30. Thus, in this alternative arrangement, and again with reference to the perspective shown in FIG. 2, the passageways 12 are vertically aligned with those in the common column and are further horizontally aligned with those in a common peripheral row.

Figure 3:
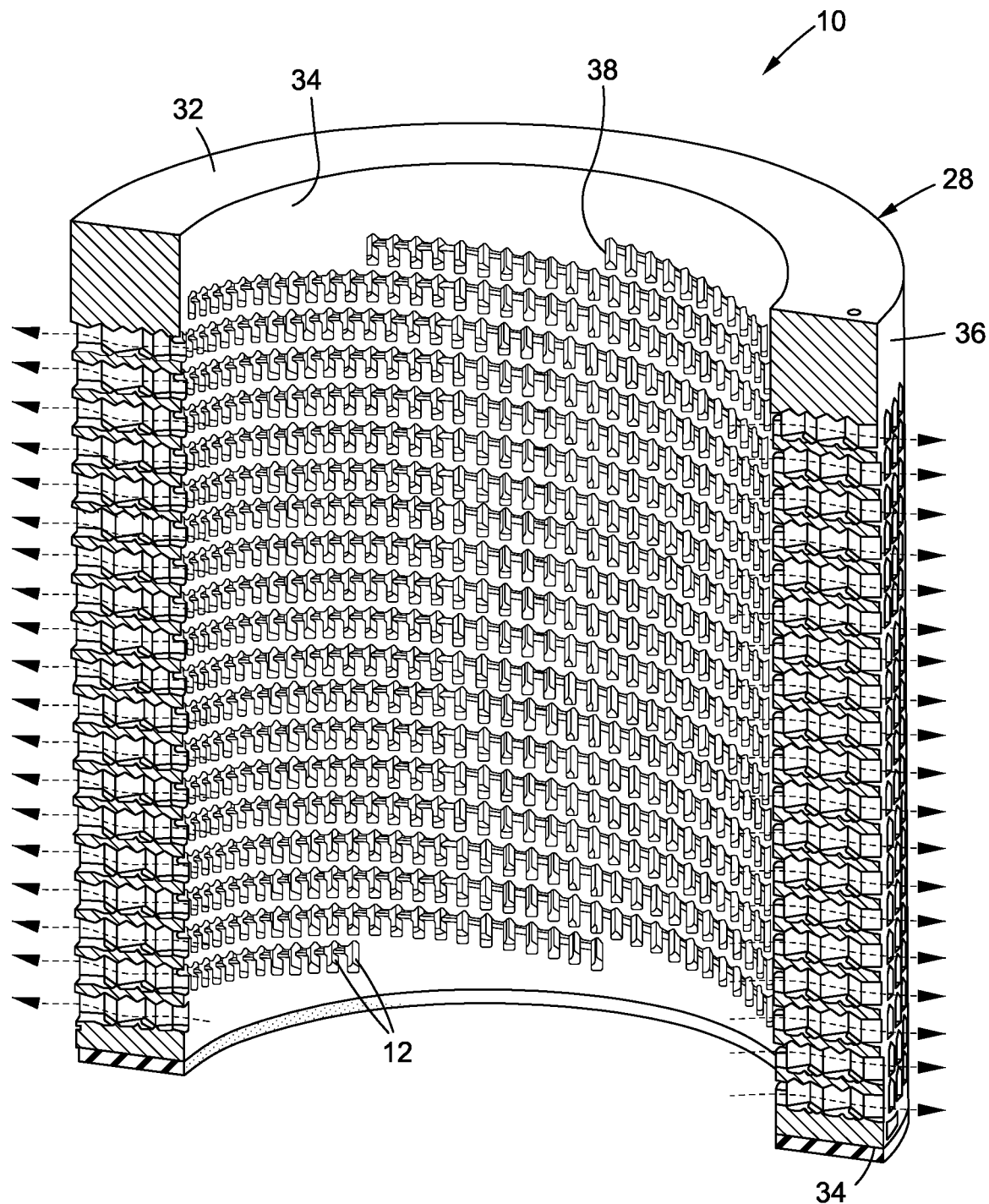
FIG. 3 is an upper perspective, cross-sectional view of the flow control element of FIG. 2.

FIG. 3 is a vertical cross-sectional view of the element body 28 to illustrate the internal configuration of passageways 12 aligned along a common vertical column or array, with the dotted arrows being representative of an exemplary fluid flow through each passageway 12, with fluid flowing in a radially outward direction.

Figure 4:
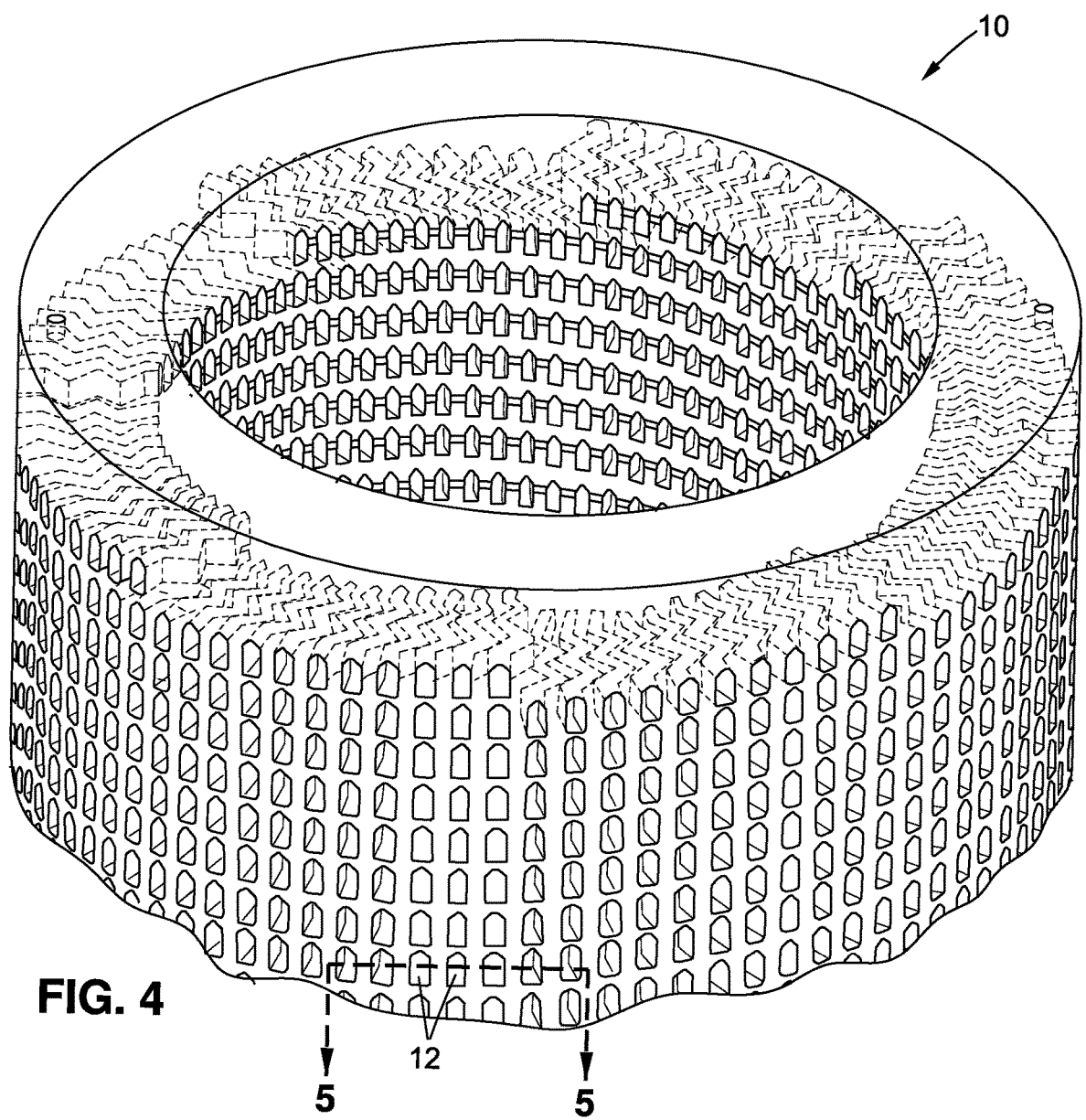
FIG. 4 is an upper perspective, enlarged partial view of the flow control element of FIG. 3.
Figure 5:
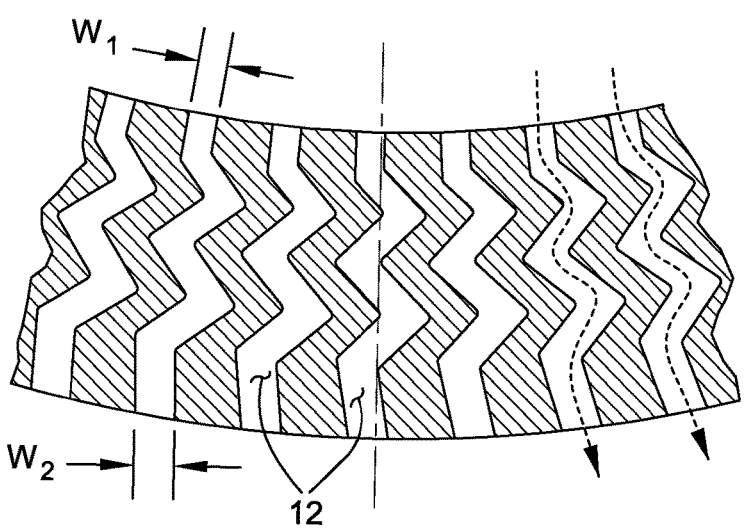
FIG. 5 is a cross-sectional view of a portion of the flow control element taken along line 5-5 in FIG. 4.
Figure 7:
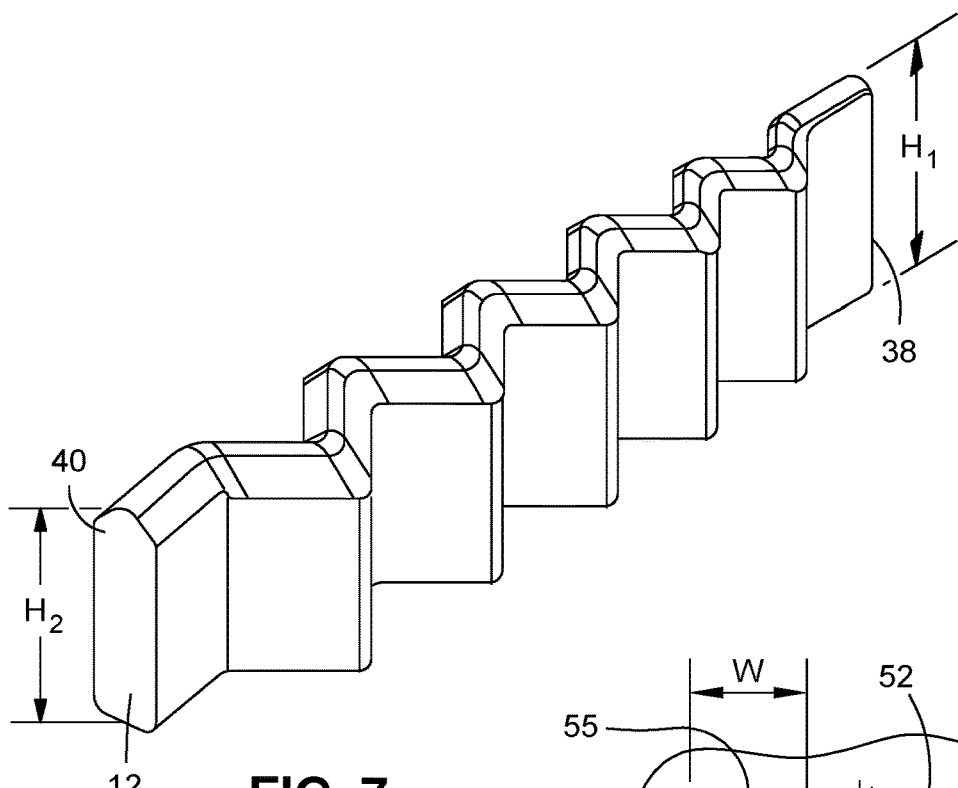
FIG. 7 is an upper perspective view of an exemplary configuration of a passageway.

FIG. 4 is a partial upper perspective view of a portion of the flow control element 10, with various passageways 12 being depicted in dotted lines to represent the internal nesting and arrangement of the passageways 12 within the element body 28. The passageways 12 may be identical or substantially similar in configuration to allow the passageways 12 to be nested next to each other so as to maximize the number of passageways 12 that can fit within the flow control element 10. For instance, one passageway 12 may include a protruding or convex segment that nests within an inwardly extending or concave segment of an adjacent passageway 12.

Figure 6:
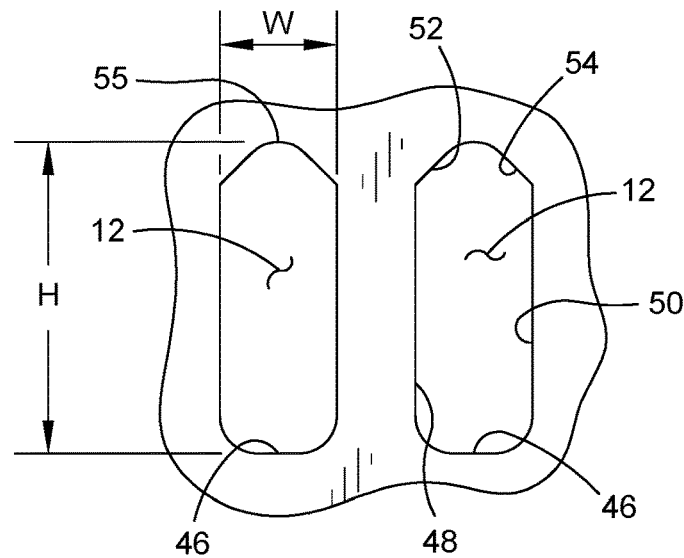
FIG. 6 is a plan view of a pair of passageways included in the flow control element.

Referring now to FIGS. 5-8, each passageway 12 may have a configuration which facilitates the attainment of desired fluid characteristics of fluid flowing therethrough and allows the passageways 12 to be nested together in a structure formed via additive manufacturing techniques. According to one embodiment, and in accordance with the perspectives/frames of reference shown in FIGS. 2-4 and 6, each passageway 12 includes a base surface 46, a pair of side surfaces 48, 50 and a pair of beveled surfaces 52, 54. The base surface 46 may be generally planar and extend perpendicularly relative to the body axis 30. The pair of side surfaces 48, 50 may both extend from the base surface 46 in generally opposed relation to each other. In one embodiment, the side surfaces 48, 50 are similar in confirmation and generally parallel to each other. As shown in FIG. 6, it is contemplated that in accordance with the preferred additive manufacturing process employed to facilitate the fabrication of the flow control element 10, the junction between the base surface 46 and respective ones of the side surfaces 48, 50 will not be defined by a sharp, ninety degree corner. Rather, each transitional region will have an arcuate or radiused profile.

The beveled surfaces 52, 54 extend from respective side surfaces 48, 50. The beveled surfaces 52, 54 extend toward each other to define a peak at the intersection of the beveled surfaces 52, 54. As further shown in FIG. 6, it is contemplated that in accordance with the preferred additive manufacturing process employed to facilitate the fabrication of the flow control element 10, the junction between the beveled surfaces 52, 54 will not be defined by a sharp, ninety degree corner. Rather, the aforementioned transitional region or peak will have an arcuate or radiused profile. The shape and arrangement of the beveled surfaces 52, 54 may assist in providing strength and structural integrity to the corresponding passageway 12, especially during the process of manufacturing of the flow control element 10. Furthermore, the beveled surfaces 52, 54 may provide structure support to overlying passageways 12 in the flow control element 10.

The side surfaces 48, 50 may define a width, W, of the passageway 12 as the distance between the side surfaces 48, 50 in a direction perpendicular to both side surfaces 48, 50. The width W of the passageway 12 may vary along the passageway 12 so as to include a narrow portion and a wide portion to facilitate desired fluid characteristics. In the exemplary embodiment depicted in FIG. 8, the width increases from the inside to the outside (i.e., from the inner opening 38 at the inner peripheral surface 34 to the outer opening 40 at the outer peripheral surface 36) to control fluid expansion. In this regard, the passageway 12 may define a first width $W_1$ at the inner opening 38 and a larger, second width $W_2$ at the outer opening 40. However, depending on the direction of fluid flow through the control valve 14 into which the flow control element 10 is integrated, it is contemplated that a reverse configuration could be employed wherein the width increases from the outside to the inside (i.e., from the outer opening 40 at the outer peripheral surface 36 to the inner opening 38 at the inner peripheral surface 34).

Figure 8:
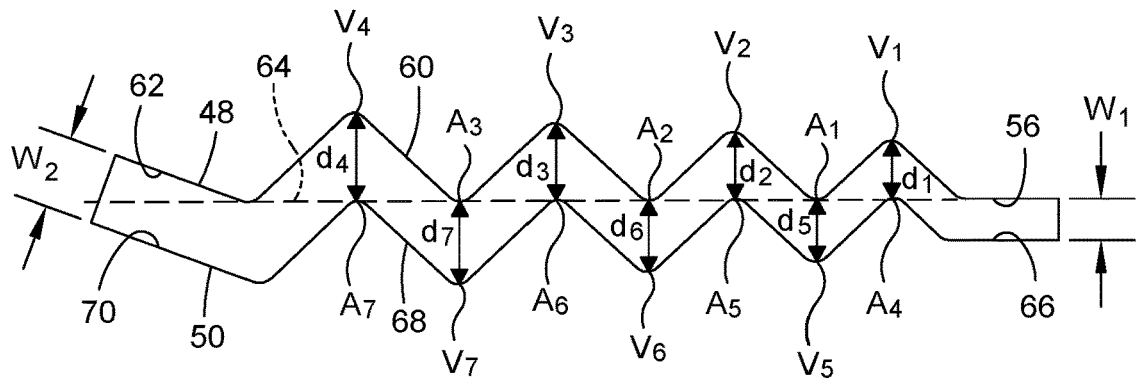
FIG. 8 is a bottom view of the passageway shown in FIG. 7.

Referring now specifically to FIG. 8, as indicated above, each passageway 12 is partially defined by a first side surface 48 and a second side surface 50. The first side surface 48 includes an inner segment 56 proximate the end opening (either inner or outer) of width $W_1$ and an outer segment 62 proximate the end opening (either inner or outer) of width $W_2$. Extending between the inner and outer segments 56, 62 is a plurality of intermediate segments 60. Relative to a common reference axis 64, the inner segment 56 is coincident therewith, whereas the intermediate and outer segments 60, 62 each extend at a prescribed angle relative thereto. Adjacent pairs of the intermediate segments 60 may define a series of apexes $A_{1-3}$ and valleys $V_{1-4}$, i.e., each of apexes $A_{1-3}$ and each of valleys $V_{1-4}$ is defined by an adjacent pair of intermediate segments 60. The apexes $A_{1-3}$ define a first set thereof which may be positioned to reside on the common axis 64. Each of valleys $V_{1-4}$ may be spaced from the common axis 64 by a respective distance, d. In particular, valley $V_1$ is spaced from the common axis 64 by a distance d1, valley $V_2$ is spaced from the common axis 64 by a distance d2, valley $V_3$ is spaced from the common axis 64 by a distance d3, and valley $V_4$ is spaced from the common axis 64 by a distance d4. The magnitude of d1 is less than d2, which is less than d3, which is less than d4. In this regard, the separation distance of the valleys $V_{1-4}$ from the common axis 64 increases as the separation distance from the end opening (either inner or outer) of width $W_1$ increases.

The second side surface 50 is like the first side surface 48. In particular, the second side surface 50 includes an inner segment 66 proximate the end opening (either inner or outer) of width $W_1$ and an outer segment 70 proximate the end opening (either inner or outer) of width $W_2$. Extending between the inner and outer segments 66, 70 is a plurality of intermediate segments 68. Relative to the common reference axis 64, the inner segment 66 extends in spaced, generally parallel relation thereto, whereas the intermediate and outer segments 68, 70 each extend at a prescribed angle relative thereto. Adjacent pairs of the intermediate segments 68 may define a series of apexes $A_{4-7}$ and valleys $V_{5-7}$, i.e., each of apexes $A_{4-7}$ and each of valleys $V_{5-7}$ is defined by an adjacent pair of intermediate segments 68. The apexes $A_{4-7}$ define a second set thereof which may be positioned to reside on the common axis 64. Each of valleys $V_{5-7}$ may be spaced from the common axis 64 by a respective distance, d. In particular, valley $V_5$ is spaced from the common axis 64 by a distance d5, valley $V_6$ is spaced from the common axis 64 by a distance d6, and valley $V_7$ is spaced from the common axis 64 by a distance d7. The magnitude of d5 is less than d6, which is less than d7. In this regard, the separation distance of the valleys $V_{5-7}$ from the common axis 64 increases as the separation distance from the end opening (either inner or outer) of width $W_1$ increases.

By configuring the passageways 12 such that all of the apexes $A_{1-7}$ of both side surfaces 48, 50 reside on the common axis 64, fluid is prevented from flowing in a constant, linear path through the middle of the passageway 12. Thus, the entirety of the fluid flowing through the passageway 12 is forced to change course as it flows through the tortuous configuration, thereby facilitating desired pressure drop in the fluid. Those of ordinary skill in the art will recognize that each passageway 12, though being tortuous, may be alternatively configured such that the width thereof is constant along the entire length thereof (i.e., between the inner and outer openings defined thereby) such that there is no variance between d1-d7.

In addition to variations in width W of the passageway 12, it is contemplated that variations in height of the passageway 12 may also be incorporated into the flow control element 10 to facilitate desired fluid characteristics of fluid flowing through the passageway 12. A height, H, of the passageway 12 may be refer to the distance between the base surface 46 and an apex 55 defined by the beveled surfaces 52, 54. The height H of the passageway 12 may vary along the passageway 12 so as to include a low portion and a tall portion to facilitate desired fluid characteristics. In the exemplary embodiment depicted in FIG. 7, the height H increases from the inside to the outside (i.e., from the inner opening 38 at the inner peripheral surface 34 to the outer opening 40 at the outer peripheral surface 36) to control fluid expansion. In this regard, the passageway 12 may define a first height $H_1$ at the inner opening 38 and a larger, second height $H_2$ at the outer opening 40. However, depending on the direction of fluid flow through the control valve 14 into which the flow control element 10 is integrated, it is contemplated that a reverse configuration could be employed wherein the height H increases from the outside to the inside (i.e., from the outer opening 40 at the outer peripheral surface 36 to the inner opening 38 at the inner peripheral surface 34).

The configuration of the flow control element 10 may result in a reduction in the overall size of the flow control element 10, relative to conventional flow control elements formed with disk stacks, by significantly reducing the amount of material used to contain the passageways 12. In this regard, the size of the control valve 14 which houses the flow control element 10 may be reduced. Furthermore, the reduced size may facilitate installation of tortuous path valves in facilities with severe space constraints, such as offshore platforms and ocean vessels.

The foregoing describes various embodiments of the flow control element 10 that may be formed via additive manufacturing, which may include, but is not limited to three-dimensional printing, laser sintering, or other layer-by-layer manufacturing techniques known or later developed by those skilled in the art. Along these lines, forming techniques which could potentially be used to facilitate the fabrication of the flow control element 10 are described, for example, in Applicant's U.S. Pat. No. 8,826,938, the disclosure of which is incorporated herein by reference.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A flow control element comprising:
an element body formed as a unitary structure and disposed about a body axis and having:
a first surface;
a second surface in spaced relation to the first surface;
an inner peripheral surface extending between the first and second surfaces and defining a central bore extending along the body axis;
an outer peripheral surface extending between the first and second surfaces in spaced relation to the inner peripheral surface; and
a plurality of passageways extending between the inner peripheral surface and the outer peripheral surface, each passageway having an inner opening in the inner peripheral surface and an outer opening in the outer peripheral surface, the passageways being presented in an array of generally vertical columns wherein the passageways in each of the columns are in vertical alignment with each other and are positioned along a column axis which is generally parallel to the body axis, the passageways in any one column being slightly offset relative to the passageways in any adjacent column in a direction generally parallel to the body axis such that the passageways are presented in a generally helical array about the element body.

2. The flow control element recited in claim 1, wherein each passageway extends along at least two axes.

3. The flow control element recited in claim 1 wherein each passageway has a pair of side surfaces extending in generally opposed relation to each other and a pair of beveled surfaces extending toward each other from respective ones of the pair of side surfaces.

4. The flow control element recited in claim 3, wherein each passageway defines a width as a perpendicular distance between the pair of side surfaces, each passageway being configured such that the width varies along the passageway.

5. A flow control element comprising:
an element body formed as a unitary structure and disposed about a body axis and having:
a first surface;
a second surface in spaced relation to the first surface;
an inner peripheral surface extending between the first and second surfaces and defining a central bore extending along the body axis;
an outer peripheral surface extending between the first and second surfaces in spaced relation to the inner peripheral surface; and
a plurality of passageways extending between the inner peripheral surface and the outer peripheral surface, each passageway having a pair of side surfaces extending in generally opposed relation to each other and a pair of beveled surfaces extending toward each other from respective ones of the pair of side surfaces, at least two of the plurality of passageways being offset in a direction parallel to the body axis.

6. The flow control element recited in claim 5, wherein the plurality of passageways are arranged in a plurality of axial arrays, each array being parallel to the body axis.

7. The flow control element recited in claim 6, wherein each passageway includes an opening at the outer peripheral surface, the openings of the passageways in adjacent arrays being offset relative to each other in a direction parallel to the body axis.

8. The flow control element recited in claim 5, wherein each passageway extends along at least two axes.

9. The flow control element recited in claim 8, wherein each side surface includes at least two angled intermediate segments adjacent each other and defining an apex therebetween.

10. The flow control element recited in claim 9, wherein the pair of side surfaces include a first side surface having a first set of apexes aligned along a common axis.

11. The flow control element recited in claim 10, wherein the pair of side surfaces include a second side surface having a second set of apexes aligned along the common axis.

12. The flow control element recited in claim 5, wherein each passageway defines a width as a perpendicular distance between the pair of side surfaces, each passageway being configured such that the width varies along the passageway.

13. A fluid control valve comprising:
a valve housing having a fluid inlet and a fluid outlet;
a flow control element disposed within the valve housing between the fluid inlet and the fluid outlet, the fluid control valve being formed as a unitary structure and disposed about a central axis, the flow control element having:
a first surface;
a second surface in spaced relation to the first surface;
an inner peripheral surface extending between the first and second surfaces and defining a central bore extending along the body axis;
an outer peripheral surface extending between the first and second surfaces in spaced relation to the inner peripheral surface; and
a plurality of passageways extending between the inner peripheral surface and the outer peripheral surface, each passageway having a pair of side surfaces extending in generally opposed relation to each other and a pair of beveled surfaces extending toward each other from respective ones of the pair of side surfaces.

14. The flow control element recited in claim 13, wherein the plurality of passageways are arranged in a plurality of axial arrays, each array being parallel to the body axis.

15. The flow control element recited in claim 14, wherein each passageway includes an opening at the outer peripheral surface, the openings of the passageways in adjacent arrays being offset relative to each other in a direction parallel to the body axis.

16. The flow control element recited in claim 13, wherein each passageway extends along at least two axes.

17. The flow control element recited in claim 16, wherein each side surface includes at least two angled intermediate segments adjacent each other and defining an apex therebetween.

18. The flow control element recited in claim 17, wherein the pair of side surfaces include a first side surface having a first set of apexes aligned along a common axis.

19. The flow control element recited in claim 18, wherein the pair of side surfaces include a second side surface having a second set of apexes aligned along the common axis.

20. The flow control element recited in claim 13, wherein each passageway defines a width as a perpendicular distance between the pair of side surfaces, each passageway being configured such that the width varies along the passageway.

* * * * *